Aug. 12, 1969 B. N. PARKER 3,461,427

IDENTIFICATION OF DIGITAL SIGNALS RESULTING FROM SCANNING RECORDED CHARACTERS

Filed Jan. 21, 1966 6 Sheets-Sheet 1

Inventor
Barry N. Parker
By Lemon, Palmer, Stewart & Estabrook
Attorney

Inventor
Barry N. Parker
By Kemon, Palmer,
Stewart & Estabrook
Attorneys

Inventor
Barry N. Parker
By Kenon, Palmer, Stewart & Estabrook
Attorneys

Aug. 12, 1969 B. N. PARKER 3,461,427

IDENTIFICATION OF DIGITAL SIGNALS RESULTING FROM SCANNING RECORDED CHARACTERS

Filed Jan. 21, 1966 6 Sheets-Sheet 4

Inventor
Barry N. Parker
By Kemon, Palmer, Stewart & Estabrook
Attorneys

CONDITIONS OF BISTABLE CIRCUITS IN SHIFT REGISTER

| CHARACTERS TO BE IDENTIFIED | TABLE I | | TABLE II |
|---|---|---|---|
| 0 | 001100 | | 111010111 |
| 1 | 010001 | | 110111101 |
| 2 | 000110 | | 111101011 |
| 3 | 000101 | | 111101101 |
| 4 | 001001 | | 111011101 |
| 5 | 011000 | | 110101111 |
| 6 | 010100 | | 110110111 |
| 7 | 000011 | | 111110101 |
| 8 | 010010 | | 110111011 |
| 9 | 001010 | | 111011011 |
| A∧ | 110000 | | 101011111 |
| B∟ | 101000 | | 101101111 |
| C− | 100100 | | 101110111 |
| D⅃ | 100010 | | 101111011 |
| E/ | 100001 | | 101111101 |
| A | 000010 | | 1111101100 |
| B | 010101 | | 1101101101 |
| C | 111000 | | 1010101111 |
| D | 011001 | | 1101011101 |
| E | 001101 | | 1110101101 |
| F | 110100 | | 1010110111 |
| G | 110001 | | 1010111101 |
| H | 001000 | | 1110111100 |
| I | 100000 | | 1011111100 |
| J | 000100 | | 1111011100 |
| K | 010110 | | 1101101011 |
| L | 010000 | | 1101111100 |
| M | 011100 | | 1101010111 |
| N | 001110 | | 1110101011 |
| O | 000001 | | 1111110100 |
| P | 011010 | | 1101011011 |
| Q | 000111 | | 1111010101 |
| R | 100101 | | 1011101101 |
| S | 101001 | | 1011011101 |
| T | 110010 | | 1010111011 |
| U | 001011 | | 1110110101 |
| V | 100011 | | 1011110101 |
| W | 101010 | | 1011011011 |
| X | 010011 | | 1101110101 |
| Y | 100110 | | 1011101011 |
| Z | 101100 | | 1011010111 |
| | | | |

Fig.4.

Inventor
Barry N. Parker
By Kemon Palmer, Stewart & Estabrook
Attorneys

TABLE III

| BISTABLES IN SHIFT REGISTER | | | | | | | | | SHIFT PULSES | INFORM. PULSES |
|---|---|---|---|---|---|---|---|---|---|---|
| a | b | c | d | e | f | g | h | i | | |
| 0 | 0 | 0 | 0 | 0 | 0 | 0 | 0 | 0 | RESET STATE | |
| 1 | 0 | 0 | 0 | 0 | 0 | 0 | 0 | 0 | | $P_1$ |
| 0 | 1 | 0 | 0 | 0 | 0 | 0 | 0 | 0 | $S_1$ | |
| 1 | 1 | 0 | 0 | 0 | 0 | 0 | 0 | 0 | | $P_2$ |
| 0 | 1 | 1 | 0 | 0 | 0 | 0 | 0 | 0 | $S_2$ | |
| 1 | 1 | 1 | 0 | 0 | 0 | 0 | 0 | 0 | | $P_3$ |
| 0 | 1 | 1 | 1 | 0 | 0 | 0 | 0 | 0 | $S_3$ | |
| 0 | 0 | 1 | 1 | 1 | 0 | 0 | 0 | 0 | $S_4$ | |
| 1 | 0 | 1 | 1 | 1 | 0 | 0 | 0 | 0 | | $P_4$ |
| 0 | 1 | 0 | 1 | 1 | 1 | 0 | 0 | 0 | $S_5$ | |
| 0 | 0 | 1 | 0 | 1 | 1 | 1 | 0 | 0 | $S_6$ | |
| 1 | 0 | 1 | 0 | 1 | 1 | 1 | 0 | 0 | | $P_5$ |
| 0 | 1 | 0 | 1 | 0 | 1 | 1 | 1 | 0 | $S_7$ | |
| 1 | 1 | 0 | 1 | 0 | 1 | 1 | 1 | 0 | | $P_6$ |
| 0 | 1 | 1 | 0 | 1 | 0 | 1 | 1 | 1 | $S_8$ | |
| 1 | 1 | 1 | 0 | 1 | 0 | 1 | 1 | 1 | | $P_7$ |

Inventor
Barry N. Parker
By Kemon, Palmer, Stewart & Estabrook
Attorneys

United States Patent Office 3,461,427

Patented Aug. 12, 1969

3,461,427

IDENTIFICATION OF DIGITAL SIGNALS RESULTING FROM SCANNING RECORDED CHARACTERS

Barry Norman Parker, Ascot, England, assignor to Crosfield Electronics Limited, London, England, a British company Continuation-in-part of application Ser. No. 348,492, Mar. 2, 1964. This application Jan. 21, 1966, Ser. No. 522,067

Claims priority, application Great Britain, Mar. 4, 1963, 8,553/63

Int. Cl. G06k 9/00

U.S. Cl. 340—146.3 5 Claims

This invention relates to systems for identifying digital coded signals resulting from the scanning of recorded characters of the kind known as C.M.C. 7. These characters are described in detail in British Patent No. 910,228. Each character of the code is composed of a fixed number of parallel bars each bar having a predetermined width within a given tolerance range and homologous edges of the bars being separated by spaces of two markedly different widths to be referred to as longer and shorter spaces. Each of the numeric characters includes seven bars, adjacent ones being separated respectively by two of the longer and four of the shorter spaces, so that the total width of all the numeric characters is the same within a given tolerance range and the relative positions of the shorter and longer spaces within the fixed total width serve to identify the individual characters. The characters of the code which represent alphabetic letters similarly include seven bars separated by either one or three longer spaces and five or three shorter spaces respectively. British Patent No. 910,228 also describes a modified form of code in which the width of bars preceding the longer intervals is increased but the characters composed of vertical bars of equal widths are the ones which have become widely used and have been recognised by the International Standards Organisation in document No. ISO/TC 97 (Secretariat-32), 65. The width of the bars set out in this document for C.M.C. 7 code is specified as 0.15 mm.+0.004 mm. to 0.15 mm.−0.05 mm., the distance between homologous edges of adjacent bars separated by a longer space is 0.5 mm.∓0.04 mm. and the distance between homologous edges of adjacent bars separated by a shorter space is 0.3 mm.±0.04 mm. An important feature of this code which is utilised in an identification method embodying the present invention is that the distance between either edge of a bar followed by a shorter space to the centre of the next succeeding bar is less than the distance between the homologous edge of a bar followed by a longer space to the leading edge of its next succeeding bar. Though the apparatus of the present application is specifically intended to identify characters of the C.M.C. 7 code in which the characters are designed to approximate in appearance to conventional characters, it could be used for identifying characters with a similar bar formation which are not readily legible or adapted without difficulty to identify characters not of the C.M.C. 7 code but built up on the same principle having different characters distinguished by the relative positions of longer and shorter spaces provided the longer space is not less than the shorter space plus half the maximum bar width as discussed.

In general use the characters are printed in magnetisable ink and scanned electromagnetically but, clearly, the use of different methods of presentation and scanning such as printing with conventional ink and scanning photoelectrically are equivalent. The electrical digital signals resulting from the scanning of characters of the C.M.C. 7 code by any appropriate method includes sequences of pulses, each sequence occupying a time interval equal to that required to scan the character and the timing of the individual pulses within the sequence being characteristic of the particular character scanned. Each time interval between successive pulses in the sequence has one of two markedly different durations, equal to the time between scanning homologous edges of bars separated respectively by shorter and longer spaces, and these durations are referred to hereafter as shorter and longer time intervals.

Existing systems for reading characters of this kind, such as for example the systems described in British Patent 915,344, include time measuring devices for measuring the lengths of the time intervals separating adjacent pulses of the sequences representing the characters and thus determining the positions of the longer intervals relative to those of the shorter intervals to identify the character. Both digital and analogue methods of measuring the time intervals have been proposed but both involve the use of a considerable number of circuit components. Very briefly, by way of example, the digital method disclosed in British Patent 915,344 includes a counter receiving pulses to be counted from a constant frequency pulse generator together with signals resulting from the scanning of the character for returning the counter to zero, and also a number of logical circuits connected to receive appropriate outputs of the counter for detecting whether the count registered by the counter falls within the tolerance range allocated to one of the said longer time intervals. The time measuring means of the analogue arrangement described in that patent includes at least one linear time base generator and an amplitude discriminator associated with the generator for producing a pulse when one of the said longer intervals is detected between consecutive reading signals.

The chief object of the present invention is to reduce the circuit components required in apparatus for identifying characters of the type described and more particularly to obviate the need for the pulse generator and the logic circuits of the earlier digital system or for the time base generator and discriminator circuits of the earlier analogue system.

A further object of the preferred form of the present invention is to reduce misidentification of characters. As previously stated, all characters are composed of a predetermined number of bars separated respectively by a given number of shorter and longer spaces. It is arranged that rejection of a character as unsatisfactory is registered if an acceptable number of bars is not detected indicating, for example, the presence of an ink spot simulating an extra bar or even joining two bars and effectively reducing the number of bars. A fault which is inherent in systems such as those described in British Patent 915,344 which are sensitive only to one of the two edges of each bar of the characters, including misreading due to an ink spot which effectively displaces an edge of a bar of a character to which the system is sensitive and thus changes a longer interval into a shorter interval and a subsequent shorter interval into a longer interval. Since the character still has an acceptable number of shorter and longer intervals and the correct number of bars it is not automatically rejected but, since the positions of the longer intervals relative to the shorter intervals have been altered, it is misread. It has been proposed that this serious difficulty may be overcome by providing two identical identification systems, a first arranged to be sensitive to the leading edges of each bar of the character and the second to be sensitive to the trailing edges of the bars. The results of recognition by each system would then be compared and if they did not correspond uncertain recognition would be registered. Clearly the provision of such an arrangement almost doubles the cost and size of the apparatus. It is an object of a subsidiary feature of the present invention to indicate uncertain recognition and thus prevent misreading of a character in the event of an ink spot displacing an edge of one of the bars of a character to which the system is sensitive and thus effectively interchanging the positions of adjacent shorter and longer spaces while keeping the additional circuitry required to a minimum.

According to the present invention, the chief object of simplifying the circuitry for detecting the position of the longer time intervals relative to the shorter time intervals in digital signals of the type described such as that resulting from the scanning of C.M.C. 7 characters is achieved in a character reader by providing means for generating a signal of substantially square waveform which has a voltage level of a first predetermined value for intervals substantially corresponding to the time intervals for which the bars of the character are scanned and a voltage level of a second predetermined value for time intervals corresponding to the scanning of spaces between successive bars, successive pulses of the signal of square waveform at the first predetermined level thus corresponding to the scanning of actual bars of the character and homologous edges of these bars representing pulsed being separated by the said shorter and longer intervals; a monostable circuit which is arranged to be set in synchronism with homologous edges of the signal of square waveform and which is arranged to reset to generate a short duration pulse after a predetermined delay which is substantially equal to the time interval between a given edge of a given one of the said bar-representing pulses of the signal of square waveform and the centre of a next succeeding bar-representing pulse separated from the said given bar-representing pulse by a said shorter interval, and an AND gate arranged to receive the said square wave signal together with the short duration pulses generated by the said monostable circuit and to transmit the latter only if they coincide with a time interval at which the square wave signal is at its second predetermined, space-representing, level.

It is thus arranged that the AND gate is disabled for intervals corresponding to the scanning of bars of the character and enabled for intervals corresponding to the scanning of spaces. Since the said short duration pulses only coincide with the scanning of a space when one of the longer spaces is scanned, such short duration pulses are transmitted by the AND gate only in coincidence of the scanning of the longer spaces. Signals representing the scanning of actual bars and the short duration pulses transmitted by the AND gate are applied to register means which is arranged to store in parallel manner information representing their order of generation, and thus the relative order of the longer and shorter intervals in the character. Sampling of the register when a predetermined number of items of information have been entered into it then serves to identify the character.

In the preferred embodiment of the invention to be described a bistable circuit is arranged to be set and reset respectively in response to the actual scanning of the leading and trailing edges of the bars of the character and a second monostable circuit is arranged to be set in response to the setting of the bistable circuit, that is in coincidence with the scanning of the leading edges of the bars. This second monostable circuit resets itself after an interval equal to the time interval required to scan the widest bar which is acceptable that is a bar of .19 mm. width. The output signal of this second monostable circuit constitutes the said bar-representing square wave signal which has a first predetermined level when the circuit is in its set state corresponding to the scanning of bars and a second predetermined level when the circuit is in its reset state corresponding to the scanning of spaces. On resetting, in addition to enabling the AND gate, this second monostable circuit preferably serves to set the first monostable circuit for generating the short duration pulses for application to the AND gate. Thus this first monostable circuit is not set in direct response to the actual scanning of either edge of a bar of the character to be identified but rather in response to the second monostable circuit which is itself directly responsive to the edges of the square wave output signal of the bistable circuit which coincide with the actual scanning of the leading edges of the bars.

The inclusion of the second monostable circuit in the system is not essential since, provided a high grade of printing was available, a square wave signal derived from the actual scanning of the leading and trailing edges of the bars of the characters (such as the output signal of the bistable circuit in my preferred system) could be employed directly. However, such high grade printing is not generally available, particularly where ribbon printing is used for information which cannot readily be preprinted and the use of such a second monostable circuit serves to overcome difficulties introduced by deficiencies in the printing. For example, a common deficiency of poor quality ribbon printing is that only the central portions of the bars of the character are effectively printed. If the AND gate were to be disabled only for intervals corresponding to the actual scanning of the printed bars, incorrect operation might well result from two adjacent bars suffering from this deficiency in circumstances where the first monostable circuit was set early, owing to the early sensing of the trailing edge of the first bar, and the AND gate was disabled late, owing to the late sensing of the leading edge of the next adjacent bar.

By arranging that the second monostable circuit is set in coincidence with the sensing of leading edges of the bars rather than trailing edges, the bar representing pulses of the square wave signal applied to the AND gate are arranged to coincide substantially with the actual scanning of the bars. Alternatively the second monostable circuit could be set in response to the sensing of trailing edges of the bars and this would merely have the effect of delaying the time scale of operation of the system so that it lags the actual scanning of the bars of the characters to be identified by an interval equal to the scanning of a bar. This effect would be immaterial insofar as recognition is concerned provided the separation between adjacent characters was sufficient to enable register sampling to take place satisfactorily between characters but the former arrangement facilitates the avoidance of misreading as will be described.

The register for storing the sequence of items of information representing the relative order of the longer and shorter spaces is preferably a shift register including a succession of bistable stages each capable of assuming an operated or an unoperated condition in response to the reception of an information input signal and also being responsive to the receipt of a succession of shift pulses each causing each stage of the register to assume the condition of its immediately preceding stage for shifting the information registered in the first stage consecutively along the remaining stages of the register.

In the arrangement to be described in detail, for the identification of C.M.C. 7 numeric characters, the leading edges of the output signal of the bistable circuit which coincide with the scanning of the leading edges of the bars of the character are applied to a shift register as information pulses while the short duration pulses transmitted by the AND gate are applied to the register as shift pulses together with pulses which are derived from the square wave output signal of the second monostable circuit, to be coincident with the resetting of that circuit and thus substantially coincident with the scanning of the trailing edge of the bars of the character. These latter pulses will be referred to as principal pulses and the former will be referred to as additional pulses. In this way, the additional short duration pulses are effectively fed to the register as binary zeros leaving the first stage of the register in its unoperated condition while the principal short duration pulses are fed to the register as binary ones causing the operation of the first stage of the shift register.

In an equivalent arrangement suitable for the identification of numerical or alphabetical characters including one, two or three longer spaces, the additional short duration pulses transmitted by the AND gate can be fed to the register as information pulses and the principal short duration pulses can be applied as shift pulses so that the shorter intervals between consecutive principal short duration pulses are effectively fed to the shift register as binary zeros leaving the first stage of the shift register in its unoperated condition while the longer intervals represented by additional short duration pulses are fed to the register as binary ones causing the operation of the first stage of the register. The application of a complete character-representing input signal to the system results, when the former method is employed, in each pulse of the character-representing signal being represented by a binary one or operated state of the shift register and each long space being represented by a ero or unoperated state of the shift register while the latter method results in each pulse of the input signal followed by a short space being represented by a zero or a stage of the shift register in its unoperated condition and each pulse of the input signal followed by a long space represented by a one or a stage of the shift register being in its operated condition. Clearly the first method of operation would be inconvenient for distinguishing between characters having different numbers of longer spaces since the final position of the signal in the register when sampling is required would depend upon the number of shift pulses and thus increase with the number of longer spaces in the character.

Broadly speaking, according to a subsidary feature of the present invention, misreading of a character due to the displacement of an edge of a bar to which the reader is sensitive is overcome by comparing a square waveform signal (such as that of the said second monostable circuit) which defines the instants of sensing the leading edges of the bars of a character and the time intervals immediately succeeding those instants which would be occupied by scanning bars of the maximum width acceptable with signals derived from the actual scanning of the trailing edges of the bars. If a signal representing the actual scanning of the trailing edge of a bar is separated from a signal representing the scanning of the leading edge of that bar by a time interval which is longer than that defined by the set condition of the second monostable circuit, owing to the presence of a bar of a greater width than is acceptable, uncertain recognition is indicated and reject mechanism actuated.

As previously described, in the preferred form of the invention the second monostable circuit is set in coincidence with the scanning of leading edges of the bars of the characters and resets itself after a time interval which is equal to the interval required to scan a bar with the widest width acceptable to cause the generation of the principal short duration pulses. Thus, the principal short duration pulses follow the instants of scanning the leading edges of the bars of the characters by an interval equal to the time required to scan a bar of the widest width acceptable. In order to determine whether the actual bars exceed this maximum permissible width it is merely necessary to provide a single additional AND gate which receives both the output signal from the bistable circuit and the principal short duration pulses and serves to actuate reject mechanism if a principal short duration pulse coincides with an interval in which the output signal of the bistable circuit is such as to indiacte that the scanning of a bar is in progress. In an equivalent arrangement, short duration pulses which are generated in coincidence with the actual scanning of the trailing edge of a vertical bar of a character could be applied to an additional AND gate also arranged to receive as a gating signal the output signal from the second monostable circuit. It is then arranged that uncertain recognition is indicated or reject mechanism actuated when a pulse indicating the actual scanning of the trailing edge of a bar occurs when the second monostable circuit is in its reset state showing that the bar is of a greater width than is acceptable.

It is thus arranged that the mere addition of an AND gate enables misreading of characters due to the effective displacement of a leading edge of a bar of the character effectively interchanging positions of longer and shorter spaces to be overcome.

In order that the invention may be more clearly understood a specific example of a system for identifying magnetic characters printed in the C.M.C. 7 will now be described with reference to the accompanying drawings in which:

FIGURE 1, which is broken into two parts 1*a* and 1*b*, is a block diagram of the general arrangement of a character identification system embodying the invention;

FIGURE 4 includes Tables I and II representing the condition of the bistable stages of a shift register indicating the relative positions of longer and shorter spaces in the characters to be identified, Table I shows the exact bar structure of the C.M.C. 7 for numeric and alphabetic characters and special symbols where binary 1 and binary 0 represent a bar and long and short spaces, respectively, and Table II shows an alternative method of representing the same bar structure in this case binary 1 and binary 0 representing a bar and a long space, respectively.

Figure 1A:
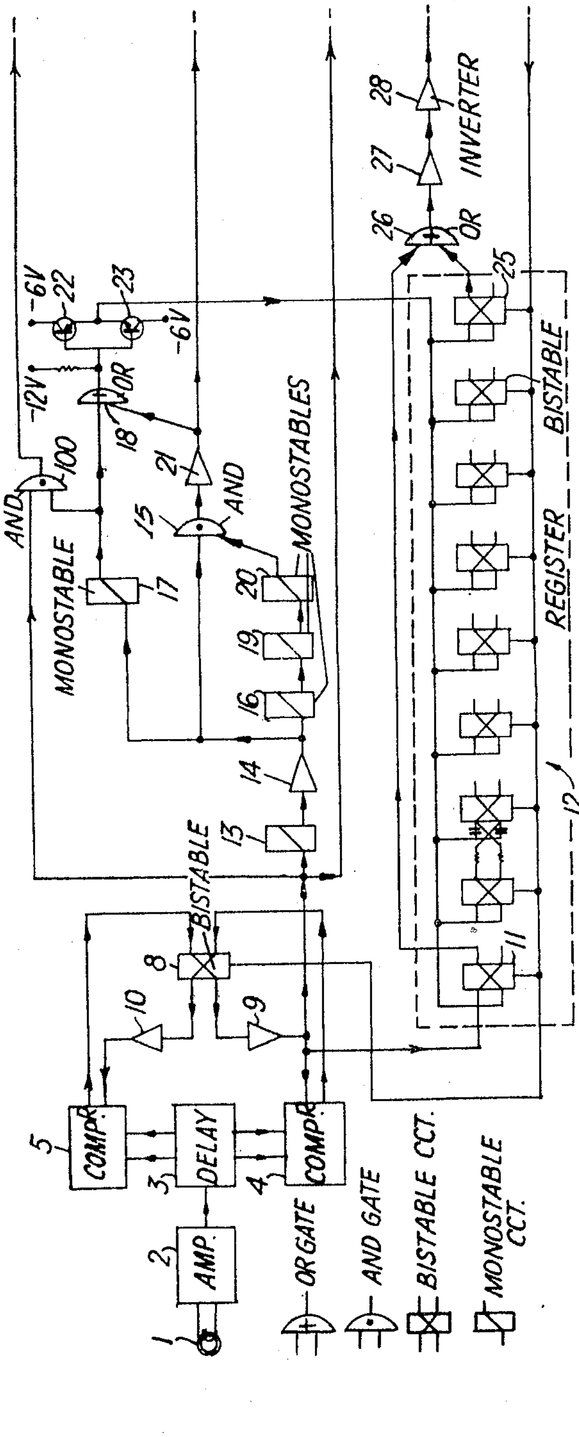
Figure 1B:
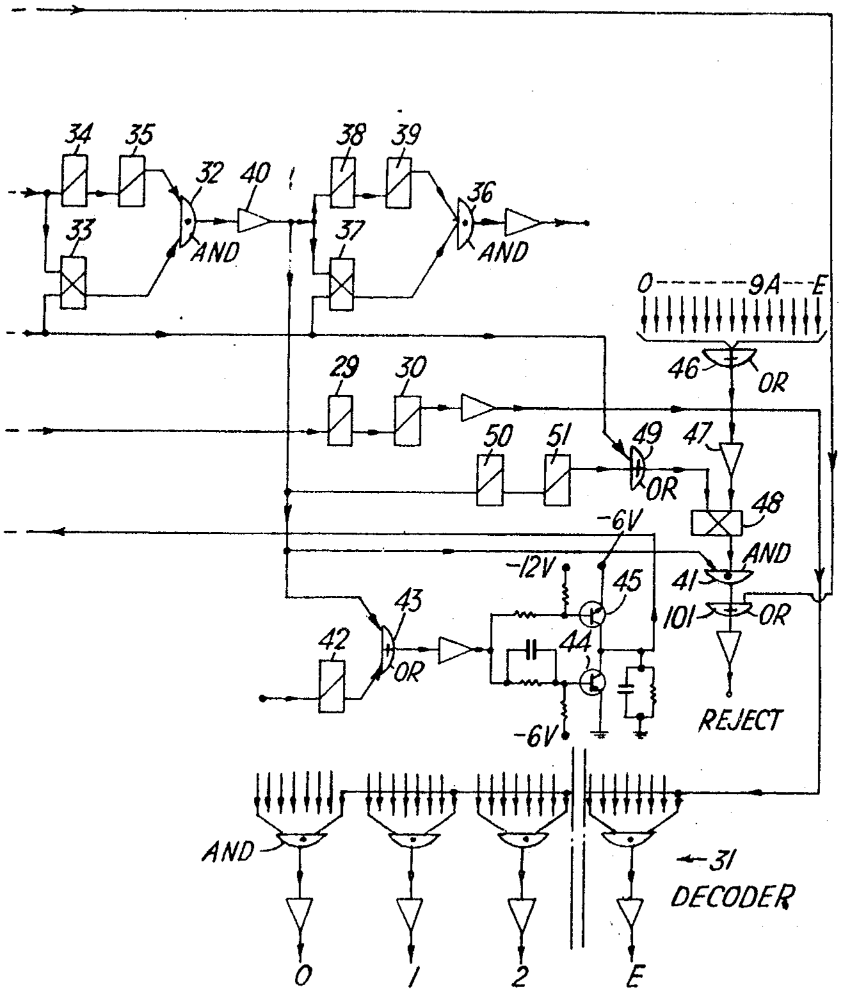
Figures 5, 6:
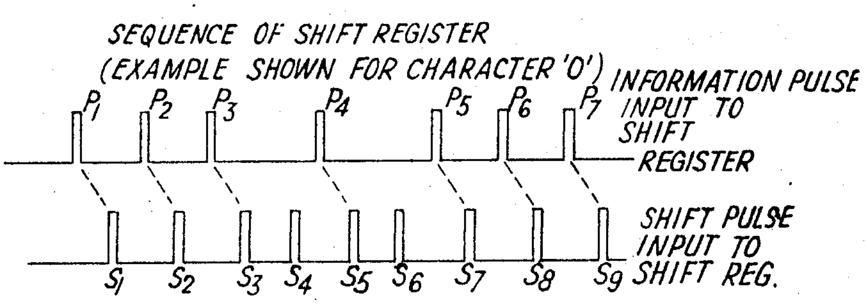

FIGURE 5 shows the input sigals applied to the shift register of FIGURE 1 resulting from scanning character "0," and FIGURE 6 shows Table III representing the sequence of operation of the bistable elements of the shift register reeciving the input signals illustrated in FIGURE 5.

Each character is composed of 7 vertical bars of magnetic ink, each bar having a width within the range 0.15 mm.—.05 mm. to 0.15 mm.+.04 mm. The positioning of these bars within each character allows them to be identified by the machine. The distance between homologous edges of two adjacent bars within a character is either 0.3 mm.±0.04 mm. (shorter interval) or .5 mm.±0.04 mm. (longer interval).

From Tables I and II of FIGURE 4 it can be seen that each character in the first two groups, representing numerals and five special symbols includes six intervals between successive bars, two longer intervals and four shorter intervals, making fifteen different combinations possible. The alphabetic characters shown in the third group have either three longer and three shorter intervals or one longer interval and five shorter intervals. Thus twenty-six alphabetic characters can be obtained.

In Table I the characters are represented in the way utilised in the second method of identification discussed above that is each binary 0 represents a bar followed by a short space in the magnetic character while the binary 1 represents a bar followed by a long space while in Table II the characters are represented in the way utilised in the first method discussed above, that is binary 1 representing the presence of a bar and binary 0 representing the presence of a longer interval. In Table II each of the characters of the first and second groups representing numerals and special symbols both begins and ends with a binary 1 and this feature is utilised in the particular system to be described for identifying these fifteen characters only in that an AND gate is provided which is responsive to the conditions of the first and last stages of the shift register to trigger the read-out means when both the stages are operated indicating that the waveform representing a complete character has been entered into the register.

The character waveform is produced in the system shown in block form in FIGURE 1 by first magnetising the characters by passing them through a magnetic field and then passing them in front of a reading head 1 which is of a type simliar to that used in tape recorders. The character bars moving parallel to the gap of the reading head 1 induce two electrical pulses for each bar, one positive and one negative for the leading right and trailing left edges respectively. The amplitude of these pulses is proportional to the height of the bar in the direction transverse to the direction of scanning by the head. The waveforms induced are then amplified by an amplifier 2 of limited bandwidth so that irregularities in the printing due to uneven distribution of the ink and presence to voids, for example, will be smoothed out in the waveform so that the output of the amplifier 2 is an idealised waveform representing the character.

Figure 3:
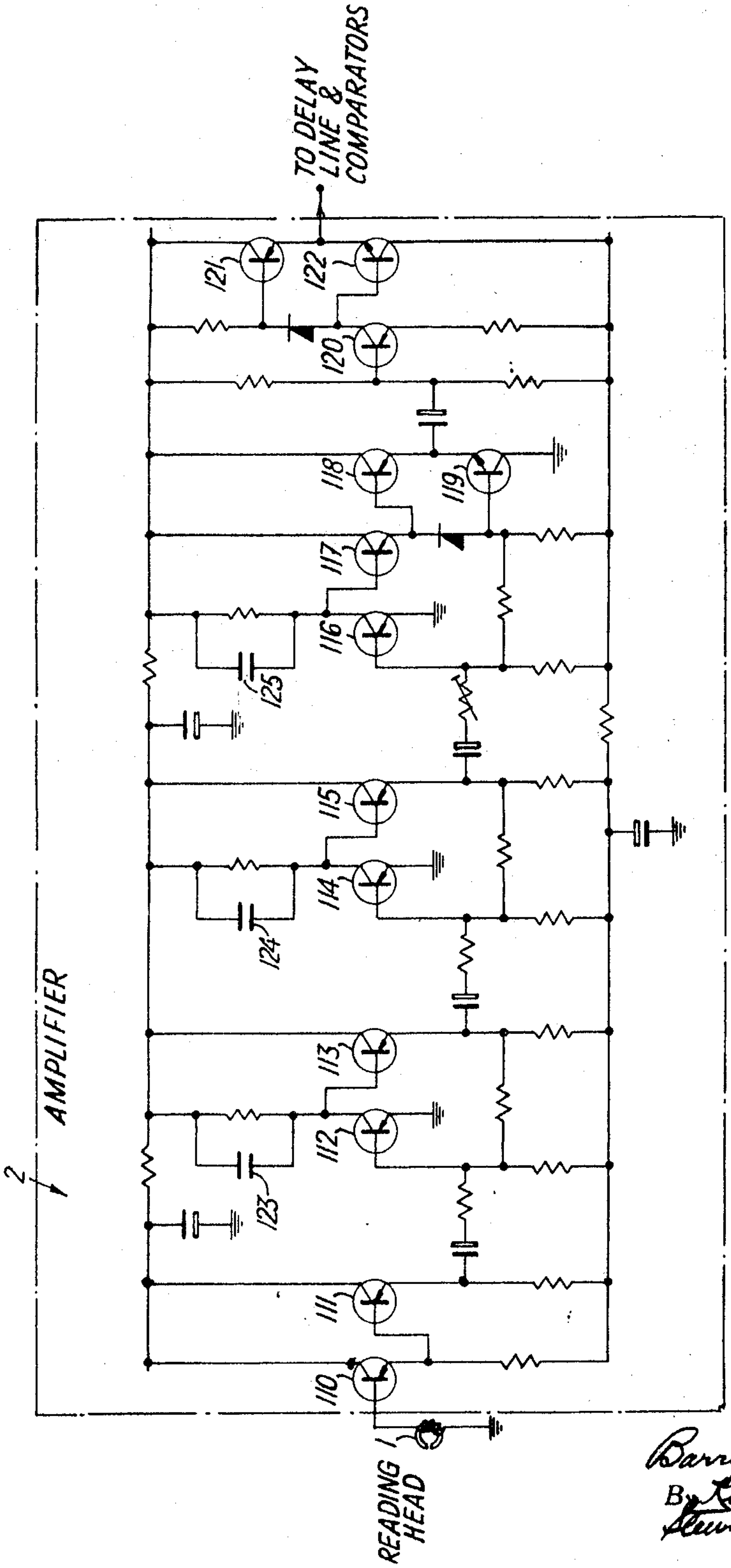
FIGURE 3 is a circuit diagram of an amplifier shown in block form in FIGURE 1.

The amplifier circuit 2 is shown in detail in FIGURE 3 of the drawings and comprises a conventional input buffer including transistors 110 and 111, three virtual earth amplifiers including transistors 112 and 113, 114 and 115, and 116 and 117 respectively, a symmetrical emitter follower, including transistors 118 and 119, a common emitter amplifier comprising transistor 120 with feedback and a further symmetrical emitter follower comprising transistors 121 and 122 in the output circuit of transistor 120. The limited frequency response is achieved by shunting the collector loads of each virtual earth amplifier with capacitors 123, 124 and 125.

As the peaks are the only well defined parts of the waveform, output pulses are generated corresponding with the positive and negative peaks respectively. Referring again to FIGURE 1, the output signal of the amplifier 2 is applied to a conventional delay line 3 where the delay time is small compared to the period of the pulses of the input waveforms. Two comparators 4 and 5 are each arranged to receive both the direct input waveform and the delayed input waveform and generate short duration output pulses coincident with the cross-over points between the direct and delayed waveforms.

Figure 2:
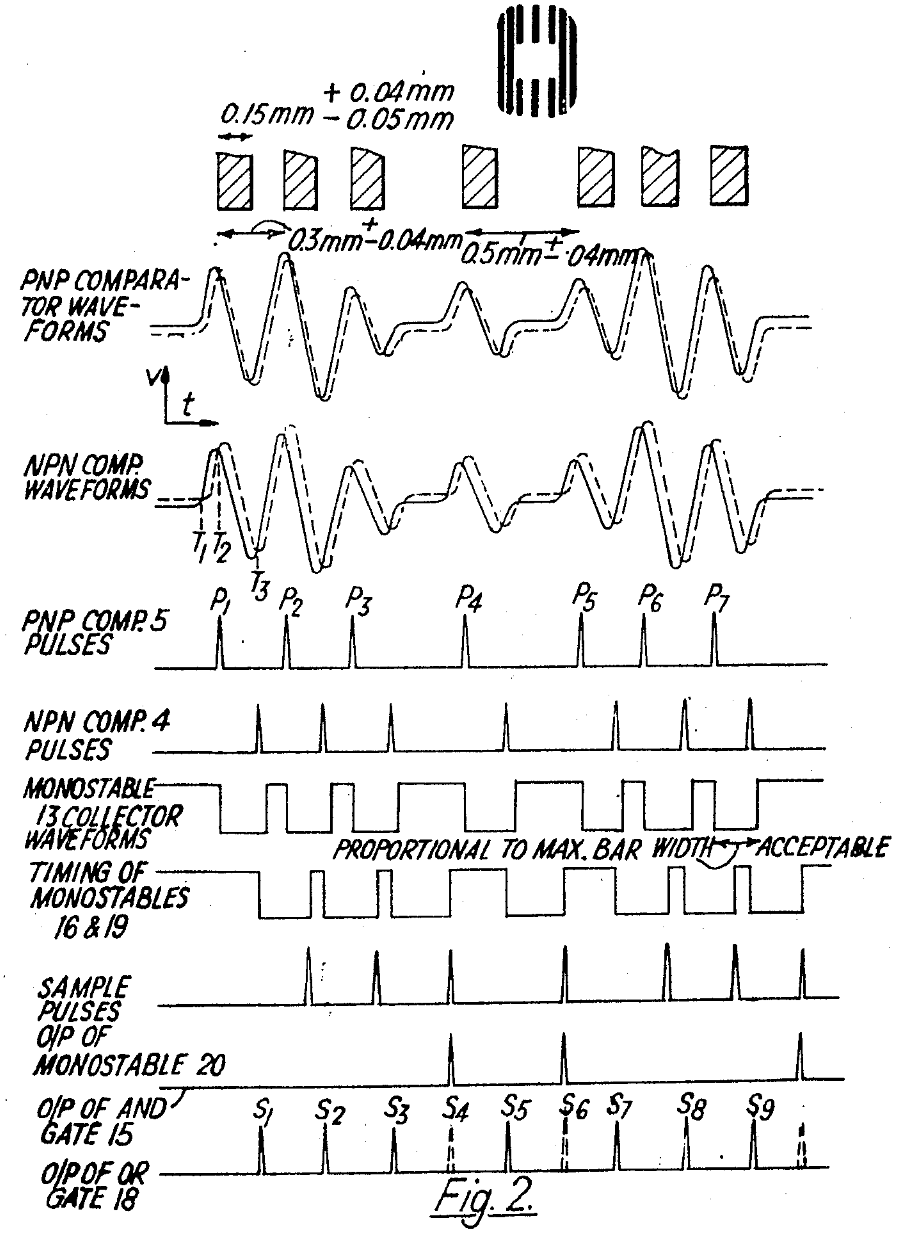
FIGURE 2 is a series of waveform diagrams illustrating the operation of the various components of the system shown in FIGURE 1 with reference to the identification of the character 0.

Considering the identification of the code representation of the character "0" shown in the top two lines of FIGURE 2, the third and fourth lines of FIGURE 2 shows the direct and delayed input signals to comparators 5 and 4 respectively, the direct input signals being depicted by continuous lines and the delayed input signals by broken lines. Comparator 5 generates output signals shown in the fifth line of FIGURE 2 coincident with the instants of cross-over adjacent to the positive peaks of its direct and its delayed input signals while comparator 4 generates short duration output pulses shown in the sixth line of FIGURE 2 coincident with the instants of cross-over between its direct and delayed input waveforms adjacent their negative peaks. The instants of generation of the short duration output pulses of the comparators 4 and 5 are separated from the instants of reception of the negative and positive peaks of the direct input waveform by an interval which is equal to half the delay of the delay line 3 but is substantially independent of variations in D.C. value.

The two comparators 4 and 5 are of the blocking oscillator type and include N-P-N and P-N-P transistors respectively. The N-P-N transistor comparator 4 generates output signals adjacent to the negative peaks of the input waveform while the P-N-P transistor comparator 5 generates output pulses adjacent the positive peaks. A bistable circuit 8 is provided for linking the operation of the two comparators 4 and 5 causing them to operate alternately. The P-N-P transistor comparator 5 is arranged to generate output pulses when the D.C. value of its delayed input signal is greater than the D.C. value of the direct input signal, but the bistable circuit 8 is arranged to be responsive to the first output signal of comparator 5 to apply a biasing voltage to the comparator to inhibit generation of further output pulses. Thus comparator 5 generates a single output pulse whenever the D.C. value of its delayed input signal rises to be equal to that of its direct input signal, a condition which occurs adjacent to each positive peak of the waveform. Transistor comparator 4 is arranged to generate output pulses whenever the magnitude of its direct waveform is greater than the magnitude of its delayed waveform except that the bistable circuit 8 is arranged to be responsive to the first of the output signals which this comparator generates to supply a biasing signal to the comparator inhibiting the generation of further output pulses. Comparator 4 therefore generates a single short duration pulse adjacent to each negative peak in the input waveform. The inhibiting output signals from the bistable circuit 8 are fed back to the comparators via buffer circuits 9 and 10 respectively. The output signals of the buffers exhibit complementary square waveforms portraying the exact bar structure of the characters. The transitions of the output signal of the buffer circuit 9 from its lower to its higher value coincide with the passage of the leading edges of the bars of the character past the reading head 1 and the transitions of the signal back to its lower value coincide with the scanning of the trailing edges of the bars. The output signal of buffer circuit 9 is applied as an information input signal to a first stage 11 of a shift register 12 and also to a monostable circuit 13 both of which are sensitive to the leading edges of its bar-representing pulses which are coincident with the scanning of the leading edges of the bars. The monostable circuit 13 has a delay equal to the time which would be occupied by the scanning of a bar of the character which had the maximum width acceptable, i.e., 0.19 mm. Thus the output signal of the monostable circuit 13 comprises a number of pulses coinciding with the scanning by the reading head 1 of the positions which would be occupied by the trailing edges of the bars of the character if the bars were of the maximum acceptable width. The output signal of the monostable circuit 13 is shown in the seventh line of the waveform diagram of FIGURE 2 and is applied via a buffer circuit 14 to an AND gate 15, so that the gate is enabled when the output signal from the monostable circuit 13, shown in line seven of the waveform diagram, is at its higher potential indicating the scanning of a space and disabled when the waveform is at its lower potential indicating effectively the scanning of a bar. The output signal from the buffer circuit 14 is also applied via two further separate channels to monostable circuits 16 and 17, respectively, which are triggered into a set condition in response to the resetting of monostable circuit 13, that is in coincidence with the effective scanning of the trailing edge of a bar. Monostable circuit 17 in response to the output signal of the buffer circuit 14 generates short duration positive output pulses which constitute the said principal pulses and are applied to OR gate 18, and, via a symmetrical emitter follower circuit, as shift pulses to the register 12. Monostable circuit 16 is connected in cascade with a further monostable circuit 19 and the total delay of these two circuits is proportional to the distance from the trailing edge of one bar of the character to the middle of the next bar in the case in which that next bar is separated from the preceding one by the shorter interval and in which both bars are considered to have the maximum width acceptable. The delay introduced by the monostable circuits 16 and 19 in series which is shown in the eight line of the waveform diagram of FIGURE 2 is used to trigger a further monostable circuit 20 which is arranged to apply short duration output pulses coincident with the trailing edge of the input signal from monostable circuit 19 (shown in line 9 of the waveform diagram of FIGURE 2) to the AND gate 15. These short duration pulses are applied to AND gate 15 and those received when the gate is in its disabled condition in response the output signal received from monostable circuit 13 are blocked whereas those received while the gate 15 is in an enabled condition are transmited and constitute the said additional pulses.

These transmitted pulses are shown in the tenth line of the waveform diagram of FIGURE 2 and are applied to the OR gate 18 via a buffer circuit 21 and thence to the shift line of the shift register 12 via the symmetrical emitter follower comprising transistors 22 and 23. The principal short duration output pulses from the monostable circuit 17 coincident with the trailing edge of the output signal from the monstable circuit 13 are similarly applied to the shift line of the shift register 12 via the OR gate 18, the input to the shift line being shown in the last line of the waveform diagram of FIGURE 2 in which the principal pulses derived from the trailing edge of an output signal from monostable circuit 13 are shown in continuous lines while the additional short duration pulses transmitted by the AND gate 15 are shown in broken lines.

The shift register 12 therefore receives information input pulses at its first stage 11 substantially coincident with the scanning of the leading edge of each bar of the character by reading head 1 and receives shift input pulses via the OR gate 18 comprising principal short duration pulses substantially coincident with the scanning of the trailing edge of the characters by the reading head 1 and additional short duration pulses coinciding with the longer intervals in the character. Hence, at the beginning of every bar of each character, the first shift register stage 11 is set to the binary 1 state and at the end of every bar and once for every long space within the character shift pulses are received by the shift register shifting the contents of the shift register one place to the right. Each time a character representing a special symbol or numeral is scanned, therefore, one of the logic patterns represented in Table II is entered into the shift register 12. The sequence of entering the information into the shift register and shifting the information along the shift register is illustrated in FIGURE 5 and Table III of FIGURE 6 with reference to the pulses produced when the numeral zero is scanned. The information input pulses applied to the first stage 11 of the shift register are shown in the first line of FIGURE 5, which corresponds with the fifth line of the waveform diagram of FIGURE 2, and the shift pulses applied to the register are shown in the second line of FIGURE 5, which corresponds to the last line of FIGURE 2. Table III of FIGURE 6 illustrates the state of each bistable stage of the shift register after reception of each individual pulse of FIGURE 5.

As previosuly mentioned, it can be seen from Table II of FIGURE 4, that in the case of characters representing numerals and symbols there is always a binary 1 in the first and last position. Thus, as the shift register has nine stages, it is possible to detect when the complete representation of the character has been entered into the register by observing the conditions of the first and last stages 11 and 25, respectively, of the register. This is done with a negative AND gate comprising a standard positive OR gate 26 followed by a buffer circuit 27 and an inverter 28. The OR gate 26 receives output signals from the both first and last stages of the shift register and the output signal from the invertor 28 is applied to the monostable circuit 29 and the trailing edge of the output pulse of this monostable triggers the further monostable circuit 30 to produce an instantaneous positive output pulse which samples fifteen decode circuits 31, each comprising an AND gate with 7 input connections which are connected to the appropriate collectors of the seven central stages of the shift register 12. The first and last stages 11 and 25 of the shift register 12 are redundant insofar as the decoding is concerned since they are always both in the binary 1 state when the decode circuits 31 are sampled. An output signal is provided at the output terminal of the decode circuit 31 corresponding with the character represented by the binary information present in the shift register 12 and therefore with the character scanned.

Extra long intervals between characters are detected by an AND gate 32 which is open as long as bistable circuit 33 is in its set condition in response to the transmission of an output pulse by AND gate 15 indicating a longer interval in the character or the end of the character, but which is closed when bistable circuit 33 is in its reset condition owing to the reception of a pulse representing the scanning of the leading edge of the bar of a character from buffer circuit 9 in the output of bistable circuit 8. The output pulses of AND gate 15 representing the presence of a longer interval are also applied via buffer stage 21 to the monostable circuit 34 which pulses the trigger circuit 35 after an interval such that the next bar following a longer interval within a character would arrive and reset bistable circuit 33 to disable the AND gate 32 before monostable circuit 35 were triggered if the character were unfinished. The monostable circuit 34 has a delay time which is equivalent to less than the least separation between immediately succeeding characters to ensure that resetting occurs before the reception of signals derived from the scanning of the next character. The pulse transmitted by AND gate 15 at the end of the character would cause monostable 34 to pulse monostable circuit 35 to cause it to generate a short duration output pulse while bistable circuit 33 is still in its set condition and therefore while AND gate 32 is enabled. Consequently only the pulse transmitted by AND gate 15 at the end of each character results in a pulse being transmitted by AND gate 32 only at the end of the character.

Even longer spaces occurring between two fields equal to at least one complete character (in length) missing are detected by identical circuitry to that employed for detecting spaces between two characters comprising AND gate 36, bistable circuit 37 and monostable circuits 38 and 39. Bistable circuit 37 is set and monostable circuit 38 is pulsed in response to an output signal from AND gate 32 via buffer circuit 40 but monostable circuit 38 has a longer delay than monostable circuit 34 such that if a character is following the character the end of which was represented by an output signal from AND gate 32 at the normal pitch the bistable circuit 37 will have been reset before monostable circuit 38 pulses monostable circuit 39. However, if there is a space equivalent to a character missing AND gate 36 will transmit the short duration output pulse generated by monostable circuit 39.

The output pulse transmitted by AND gate 32 when a long interval between characters is detected is employed to reset all the stages of the shift register after read-out and also in the event of the first and last stages 11 and 25 of the shift register not having been simultaneously in an operated condition, indicating faulty operation, but a space between characters having been detected. In this latter condition a reject of the character is registered by an output signal being transmitted by AND gate 41 which serves to operate reject mechanism via OR gate 101 and a buffer amplifier circuit. The bistable stages of the shift register 12 and the bistable circuit 8 linking the operation of the N–P–N and P–N–P comparators 4 and 5 respectively are reset by a switch arranged in series with one of their emitters being opened momentarily, the upper side of the switch being connected to a source of earth potential. In the absence of a document under the scanning head 1 no output signal is generated by a photocell (not shown) arranged in the vicinity of the reading head 1 for application to the monostable circuit 42. Under these conditions the inputs to the OR gate 43 are substantially −6 volts from the output of buffer stage 40 and earth potential from the output of monostable circuit 42. The output of OR gate 43 is thus maintained at earth potential and transistor 44 arranged in series with the emitters of the bistable circuits of the shift register 12 and of bistable circuit 8 is open as transistor 44 is cut off, but transistor 45 is conducting clamping all the said reset emitter to −6 volts. Bistable circuit 8 and all the bistable stages of the shift register 12 are therefore positively clamped in this state until a document is received and the photocell applies an input pulse to monostable circuit 42. In this condition monostable circuit 42 applies a signal of substantially −6 volts to the OR gate 43 causing transistor 44 to conduct and cutting off transistor 45, thus removing the clamping potential from bistable circuit 8 and the bistable circuit of the shift register 12 which remain reset.

When a character is identified an output pulse is generated at the output terminal of one of the decoding circuits 31 and applied to OR gate 46 and via a buffer stage 47 to set a bistable circuit 48. However if no character has been identified none of the 15 input lines to the OR gate 46 will be pulsed and hence the bistable circuit 48 will remain in its reset condition having previously been reset by the output signal from bistable circuit 8 via buffer stage and OR gate 49. Thus the pulse from buffer stage 40 indicating that the end of a character has been detected will sample the AND gate 41 which will give an output pulse indicating a reject and the pulse from buffer circuit 40 will also reset bistable circuit 48 via monostable circuits 50 and 51. If a character has been identified bistable circuit 48 will be set by the output of the decoding circuit corresponding to the character identified via OR gate 46. Thus whenever a character is recognised the output pulse from buffer circuit 40 indicating the end of a character is inhibited by AND gate 41 owing to the fact that bistable circuit 48 has already been switched to its set state. Bistable circuit 48 is reset via OR gate 49 by the first bar of the first character applied to the circuit.

Referring now to the problem of misreading which is introduced when it is arranged that the system is responsive to only one of the two vertical edges of each bar of the characters. This arrangement has the advantage that it corrects for minor variations in the widths of the bars of the characters due to errors in printing, but it has the grave disadvantage, previously discussed, that when a comparatively large ink blob coincides with the edge of a bar to which the system is sensitive it may serve effectively to shorten what should be a longer space to the length of a shorter space and to lengthen the immediately succeeding space, which would be a shorter space, so that it appears to be a longer space. For example, as can be seen from Table II of FIGURE 4, the relative positions of the longer and shorter spaces in the characters "5" and "6" are identical except that in the former, the third and fourth bars of the character are separated by a longer space and the fourth and fifth by a shorter space and in the latter these positions are reversed, the third and fourth bars being separated by a shorter space and the fifth and sixth by a longer. Since the system thus far described is sensitive to the leading edges of the bars of the character, the presence of an ink blob effectively advancing the leading edge of the fourth bar of the character "5" to a position corresponding to that occupied by the leading edge of the fourth bar of the character "6" would result in that character being misread as a character "6." In my preferred arrangement illustrated, this disadvantage is overcome by provision of AND gate 100 which is arranged to receive as a gating signal the output signal of comparator 9 which is in the form of a square wave having a first value corresponding to the durations of the intervals of scanning of the actual bars of the character and a second, lower, value corresponding to the durations of the intervals during which spaces are actually scanned by the reading head. The output pulses which follow the instants of actual scanning of the leading edges of the bars after a time interval equal to the interval required to scan a bar of maximum width acceptable, are also applied to the AND gate 100. If these principal pulses coincide with an interval during which the gating input signal to the AND gate from the comparator 9 is at its higher level, indicating that a bar of the character is still being scanned in spite of the fact that the time required to scan a bar of the maximum width acceptable has elapsed since the leading edge of that bar was scanned, a pulse is transmitted by the AND gate 100 to actuate reject mechanism via OR gate 101 and a buffer amplifier.

In the alternative arrangement in which the additional short duration pulses are applied as an information input signal to the shift register and the principal short duration pulses are employed as shift pulses, or in which the system is required to identify characters representing letters which do not necessarily begin and end with a binary 1 in Table II, the register is provided with at least two more stages than there are binary digits in the code representing the character. In response to the resetting pulse, the first stage of the register is arranged to assume the complementary state to the remaining stages that is, for example, the first stage is rest to its binary zero state while the remaining stages are reset to their binary one states. The binary zero is then shifted along the register immediately ahead of the binary states representing the character scanned subsequently fed into the register. An AND gate is connected to the two bistable stages of the register immediately ahead of the position occupied by the first binary character-representing digit when the number of information signals representing a complete character have been entered into the register and it is arranged that the AND gate is enabled when the said bistable stages connected to it are in their binary one and binary zero conditions, that is when the code representing a complete character has been fed into the register. When the AND gate is disabled it blocks the sampling pulse generated after each character is scanned but when it is enabled it transmits the sampling pulse to operate the read out system. In this way the two additional stages of the register effectively operate as a counter, enabling the gate when the complete character representing code has been fed into the register.

I claim:

1. In a system for identifying electrical coded signals resulting from the scanning of characters which are composed of a fixed number of parallel bars, adjacent bars having their homologous edges separated by intervals of two markedly different widths, and the distance between either edge of a bar of the character followed by a space of the shorter width to the center of the next succeeding bar being less than the distance between the homologous edge of a bar followed by a space of the longer width to the leading edge of the next succeeding bar, the time occupied by scanning the said shorter and longer widths being designated shorter and longer time intervals respectively and the relative positions of the said shorter and longer time intervals serving to identify the character scanned; means for detecting the position in the signal of the longer time intervals relative to the shorter time intervals comprising:

(a) means for generating a signal of substantially square waveform which includes bar-representing pulses having a voltage level of a first predetermined value for intervals substantially corresponding to the time intervals for which the bars of the character are scanned and space-representing intervals between the bar-representing pulses in which the signal has a voltage level of a second predetermined value, homologous edges of the said bar-representing pulses thus being separated by the said shorter and longer time intervals;

(b) a monstable circuit which is arranged to be set in synchronism with homologous edges of the said bar-representing pulses and which is arranged to reset and to generate a short duration pulse after a predetermined delay which is substantially equal to the time interval between a given edge of a given one of said bar-representing pulses and the centre of the next succeeding bar-representing pulse separated from the said given bar-representing pulse by a said shorter time interval;

(c) an AND gate arranged to receive the said signal of square waveform together with the said short duration pulses generated by the said monstable circuit and to transmit the said short duration pulses only if they coincide with a space-representing time interval;

(d) register means responsive both to signals representing the generation of the said bar-representing pulses and to the said short duration pulses transmitted by the said AND gate, which register means is arranged to store in a parallel manner a sequence of items of information representing the relative order of generation of the signals to which it is responsive; and (e) read-out means operative to sample the register means when a predetermined number of items of information have been entered into the register means.

2. Means according to claim 1, for detecting the relative position of the shorter and longer time intervals in an electrical coded signal, in which the means for generating the signal of substantially square waveform including the said bar-representing pulses separated by the said space-representating time intervals comprises;

(a) a bistable circuit arranged to be set and reset respectively in response to the actual scanning of the leading and trailing edges of bars of the character to be identified; and (b) a second monostable circuit arranged to be set in response to the setting of the bistable circuit in coincidence with the scanning of the leading edges of the bars of the character, the said second monostable circuit being designed to reset itself after a predetermined interval equal to the time interval required to scan the widest bar of the character which is acceptable to the system, the output signal of the second monostable circuit constituting the said signal of substantially square waveform.

3. Means according to claim 2, in which the said first monostable circuit for generating the short duration pulses for application to the said AND gate is responsive to the said second monostable circuit so that the said second monostable circuit, in addition to enabling the said AND gate to cause it to transmit the said short duration pulses, serves to set the said first monostable circuit.

4. In a system for identifying electrical coded signals resulting from the scanning of characters which are composed of a fixed number of parallel bars, homologous edges of adjacent bars being separated by intervals of two markedly different widths, and the distance between either edge of a bar followed by a space of the shorter of the two widths to the centre of the next succeeding bar being less than the distance between the homologous edge of a bar followed by a space of the longer of the two widths to the leading edge of the next succeeding bar, the time occupied by scanning the said shorter and longer widths being designated shorter and longer time intervals respectively and the relative positions of the said shorter and longer time intervals being characteristic of the character to be identified; the combination of means for determining the relative positions in the signal of the said shorter and longer time intervals and means for preventing misreading of characters owing to the effecting interchange of positions of such shorter and longer time intervals resulting from faulty printing of the character; the said combination comprising:

(a) a bistable circuit which is arranged to be set and reset respectively in response to the actual scanning of the leading and trailing edges of successive bars of a character to be identified;

(b) a monostable circuit arranged to be set in response to the setting of the said bistable circuit and to reset itself after an interval equal to the time interval required to scan the widest bar of a character which is acceptable to the system, the output signal of the said monostable circuit thus constituting a signal of square waveform including bar-representing pulses having a voltage level of a first predetermined value separated by space-representing time intervals in which the signal has a second predetermined value;

(c) a further monostable circuit arranged to be set in response to the resetting of the said first mentioned monostable circuit, the said further monostable circuit being arranged to reset and generate a short duration pulse after a predetermined delay which is substantially equal to the time interval between a given edge of a given one of the said bar-respresenting pulses of the output signal of the first mentioned monostable circuit and the centre of the next succeeding bar-representing pulse of that signal separated from the said given bar-representing pulse by a said shorter interval;

(d) a first AND gate arranged to receive the said output signal of the first mentioned monostable circuit together with the said short duration pulses generated by the said further monostable circuit and to transmit the said short duration pulses only when they coincide with a space-representing time interval of the said square wave output signal of the first monostable circuit;

(e) register means responsive both to signals representing the generation of said bar-representing pulses and to the said short duration pulses transmitted by the said AND gate which register means is arranged to store in parallel manner a sequence of items of information representing the relative order of generation of the signals to which it is responsive;

(f) read-out means operative to sample the register means when a predetermined number of items of information have been entered into the register means;

(g) a second AND gate responsive to both the output signals of the said bistable circuit and to the output signal of the said first mentioned monostable circuit representing respectively the scanning of the actual edges of successive bars of the character to be identified and the instants at which trailing edges of the bars would be scanned if those bars were of the maximum width acceptable to the system, the second AND gate serving to emit an output pulse whenever the actual width of a bar of the character to be identified exceeds the maximum width acceptable to the system; and (h) reject means responsive to output signals transmitted by the said second AND gate.

5. A combination according to claim 4, in which the said second AND gate is enabled to transmit pulses in response to output signals of the said bistable circuit representing the scanning of actual bars of the character, whereby the said second AND gate serves to transmit output signals generated in coincidence with the resetting of the said first mentioned monostable circuit when those signals coincide with an interval in which the output signal of the said bistable circuit is in its enabled condition representing the scanning of a bar.

References Cited

UNITED STATES PATENTS

| | | | |
|---|---|---|---|
| 3,303,469 | 2/1967 | Perotto | 340—146.3 |
| 3,309,667 | 3/1967 | Feissel | 340—146.3 |

MAYNARD R. WILBUR, Primary Examiner

R. F. GNUSE, Assistant Examiner